United States Patent
Hiltunen et al.

(10) Patent No.: US 8,583,135 B2
(45) Date of Patent: Nov. 12, 2013

(54) SYSTEMS AND METHODS FOR REDUCING INTERFERENCE BETWEEN AND A MACRO BASE STATION AND A FEMTO BASE STATION

(75) Inventors: Kimmo Hiltunen, Esbo (SE); Tomas Nylander, Varmdo (SE); Jari Vikberg, Jarna (SE)

(73) Assignee: Telefonaktiebolaget LM Ericsson (publ.), Stockholm (SE)

( * ) Notice: Subject to any disclaimer, the term of this patent is extended or adjusted under 35 U.S.C. 154(b) by 280 days.

(21) Appl. No.: 13/055,585

(22) PCT Filed: Jul. 25, 2008

(86) PCT No.: PCT/SE2008/050893
§ 371 (c)(1),
(2), (4) Date: Jan. 24, 2011

(87) PCT Pub. No.: WO2010/011166
PCT Pub. Date: Jan. 28, 2010

(65) Prior Publication Data
US 2011/0190003 A1    Aug. 4, 2011

(51) Int. Cl.
*H04W 72/00* (2009.01)
(52) U.S. Cl.
USPC ............. 455/452.2; 455/452.1; 455/451; 455/450; 455/444; 455/443; 370/329; 370/331; 370/342; 370/335; 370/321
(58) Field of Classification Search
USPC ........... 455/452.2, 451, 452.1, 450, 444, 443, 455/447, 464, 509; 370/329, 331, 342, 335, 370/321
See application file for complete search history.

(56) References Cited

U.S. PATENT DOCUMENTS

| | | | | |
|---|---|---|---|---|
| 6,009,332 | A  * | 12/1999 | Haartsen ........................ | 455/450 |
| 7,027,418 | B2 * | 4/2006 | Gan et al. ...................... | 370/329 |
| 7,477,624 | B2 * | 1/2009 | Gan et al. ...................... | 370/329 |
| 7,835,698 | B2 * | 11/2010 | Eyuboglu et al. ............. | 455/63.1 |
| 8,014,781 | B2 * | 9/2011 | Ji et al. ........................... | 455/449 |
| 8,036,669 | B2 * | 10/2011 | Dong et al. .................... | 455/447 |
| 2005/0096062 | A1 * | 5/2005 | Ji et al. ........................... | 455/450 |
| 2007/0243866 | A1 * | 10/2007 | Karabinis ...................... | 455/430 |
| 2007/0280170 | A1 * | 12/2007 | Kawasaki ...................... | 370/331 |
| 2008/0081633 | A1 * | 4/2008 | Oteri et al. .................... | 455/452.1 |
| 2010/0136989 | A1 * | 6/2010 | Westerberg et al. .......... | 455/450 |

FOREIGN PATENT DOCUMENTS

| | | |
|---|---|---|
| EP | 0865172 | 9/1998 |
| EP | 0898437 | 2/1999 |
| EP | 1313338 | 5/2003 |

OTHER PUBLICATIONS

European Communication Corresponding to European Application No. 0808760633.2; Dated: Sep. 26, 2012; 3 Pages.
International Search Report for PCT/SE2008/050893, May 28, 2009.

* cited by examiner

*Primary Examiner* — Kamran Afshar
*Assistant Examiner* — Sayed T Zewari
(74) *Attorney, Agent, or Firm* — Myers Bigel Sibley & Sajovec (57) ABSTRACT

Systems and methods for reducing macro-femto bas station interference are disclosed. In one aspect, macro-femto interference is reduced by configuring t macro bases station to avoid using resources allocat to the femto base station.

27 Claims, 7 Drawing Sheets

SYSTEMS AND METHODS FOR REDUCING INTERFERENCE BETWEEN AND A MACRO BASE STATION AND A FEMTO BASE STATION

CROSS-REFERENCE TO RELATED APPLICATIONS

This application is a 35 U.S.C. §371 national stage application of PCT International Application No. PCT/SE2008/050893, filed on Jul. 25, 2008, the disclosure and content of which is incorporated by reference herein in its entirety. The above-referenced PCT International Application was published in the English language as International Publication No. WO 2010/011166 on Jan. 28, 2010.

TECHNICAL FIELD

The present invention relates to wireless communication systems and method.

BACKGROUND

Some mobile network operators are investigating the possibility of providing home and/or small area coverage for a limited number of users using a small base station, commonly called a "femto" base station (or femto NodeB for WCDMA or femto eNodeB (E-UTRAN NodeB) for long term evolution (LTE)). Other common names are Home NodeB (HNB) for WCDMA or Home eNodeB (HeNB) for LTE.

A femto base station may provide normal LTE/WCDMA coverage for end users in a so called femto cell, and may be connected to the mobile operator's network using some kind of IP based transmission. One alternative is to use fixed broadband access (e.g. xDSL or Cable) to connect the femto base station to the network.

In some systems (e.g., LTE systems) the coverage area (i.e., femto cell) of a femto base station may overlap with the cell of a large base station, commonly called a "macro" base station, and the femto base station may use the same frequency spectrum (or part of the same frequency spectrum) as the macro base station. Accordingly, at times, the users of the femto and/or macro base station may experience uplink and/or downlink interference. This interference is referred to as "macro-femto interference". In this document, for purposes of brevity, the overlaying cellular network is always referred as "macro" layer, even though it may consist of both macro, micro and pico cells.

Thus, there exists a need to reduce this macro-femto interference.

SUMMARY

In one aspect, the patent provides a method performed by a first base station (e.g., a macro base station) for reducing interference in a communication system comprising the macro base station and a second base station (e.g., a femto base station) located within or near a cell serviced by the macro base station, wherein the macro base station is allocated a frequency spectrum and the femto base station is allocated a frequency spectrum that at least partially overlaps with the frequency spectrum allocated to the macro base station. In some embodiments, the method performed by the macro base station includes: (a) determining a performance metric; (b) comparing the determined performance metric to a predetermined threshold; and (c) determining whether to assign to a user terminal a resource block that is (i) within the frequency spectrum allocated to the femto base station or (ii) within a time slot allocated to the femto base station, characterized in that this determination is based, at least in part, on the result of the comparison of the performance metric with the predetermined threshold.

The bandwidth of the frequency spectrum allocated to the femto base station may be smaller than the bandwidth of the frequency spectrum allocated to the macro base station and the frequency spectrum allocated to the femto base station may completely fall within the frequency spectrum allocated to the macro base station.

In some embodiments, at least a portion of the frequency spectrum allocated to the macro base station does not overlap with the frequency spectrum allocated to the femto base station, the performance metric corresponds to an amount of the non-overlapping frequency spectrum that is currently available for use, and the step of determining whether to assign to the user terminal a resource block that is within the frequency spectrum allocated to the femto base station comprises determining whether the amount of the non-overlapping frequency spectrum that is currently available for use is (a) greater than the predetermined threshold or (b) greater than or equal to the predetermined threshold. The macro base station may assign to the user terminal a resource block that is within the frequency spectrum allocated to the femto base station if, and only if, the amount of the non-overlapping frequency spectrum that is currently available for use is (a) less than the threshold or (b) less than or equal to the threshold.

In some embodiments, steps (a) through (c) are performed in response to receiving a request from a UE. Also, in some embodiments, the macro base station or another node in the network (e.g., a gateway node) may control an active frequency spectrum of the femto base station based, at least in part, on a resource need of the macro base station.

In some embodiments, the above mentioned performance metric may correspond to the number of available resource blocks that are not within the frequency spectrum allocated to the femto base station, and the step of determining whether to assign to the user terminal a resource block that is within the frequency spectrum allocated to the femto base station comprises determining whether the number of available resource blocks is (a) less than the predetermined threshold or (b) less than or equal to the predetermined threshold.

In another aspect, the invention provides a communication system in which interference (e.g., macro-femto interference) is reduced. In some embodiments, the communication system includes: a first base station (e.g., a macro base station) servicing a first coverage area, the macro base station being allocated a frequency spectrum for servicing the first coverage area; and a second base station (e.g., a femto base station) servicing a second coverage area, the femto base station being allocated a frequency spectrum for servicing the second coverage area, wherein the second coverage area at least partially overlaps with the first coverage area, the frequency spectrum allocated to the femto base station at least partially overlaps with the frequency spectrum allocated to the macro base station, and the macro base station is configured to avoid using (i) a portion of its allocated frequency spectrum that overlaps with frequency spectrum allocated to the femto base station and/or (ii) time slots allocated to the femto base station, unless performance reasons require the use of one or more of the time slots and/or frequencies allocated to the femto base station.

In some embodiments, the bandwidth of an active frequency spectrum of the femto base station is controlled based, at least in part, on (1) a capacity need of the femto base station and/or (2) a capacity need of the macro base station. For example, the bandwidth of the active frequency spectrum of the femto base station may be increased upon a determination that (1) the capacity need of the femto base station meets or exceeds a threshold and/or (2) the capacity need of the macro base station is less than or equal to a threshold. The macro base station may be configured to avoid utilizing only the frequencies that fall within the active frequency spectrum of the femto base station. Accordingly, the macro base station may include a storage unit that stores information identifying the femto base station's active frequency spectrum.

In some embodiments, the macro base station is further configured to: (a) determine a performance metric; (b) compare the determined performance metric to a predetermined threshold; and (c) determine whether to assign to a user terminal a resource block that falls within frequency spectrum allocated to the femto base station, characterized in that this determination is based, at least in part, on the result of the comparison of the performance metric with the predetermined threshold. The performance metric may correspond to the amount of that portion of the frequency spectrum allocated to the macro base station that does not overlap with the frequency spectrum allocated to the femto base station that is currently available for use In still another aspect, the invention provides a base station that is configured to reduce the interference (e.g., macro-femto interference). In some embodiments, the base station includes means for reducing interference, characterized in that the means for reducing the interference comprises resource avoiding means for avoiding using only certain resources unless performance reasons require the use of one or more of the certain resources, wherein the certain resources include: (i) frequencies within a frequency spectrum allocated to a second base station and/or (ii) time slots allocated to the second base station.

The resource avoiding means may include means for: (a) determining a performance metric; (b) comparing the determined performance metric to a predetermined threshold; and (c) determining whether to assign to a user terminal a resource block that is (i) within the frequency spectrum allocated to the second base station or (ii) within a time slot allocated to the second base station, characterized in that this determination is based, at least in part, on the result of the comparison of the performance metric with the predetermined threshold. The determination may be further based on one more downlink CQI values received from the user terminal and/or one or more uplink CQI values estimated by the base station. The performance metric may correspond to a current amount of frequency spectrum that is available for the macro base station to assign to user terminals.

The above and other aspects and embodiments are described below with reference to the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

DETAILED DESCRIPTION

Figure 1:
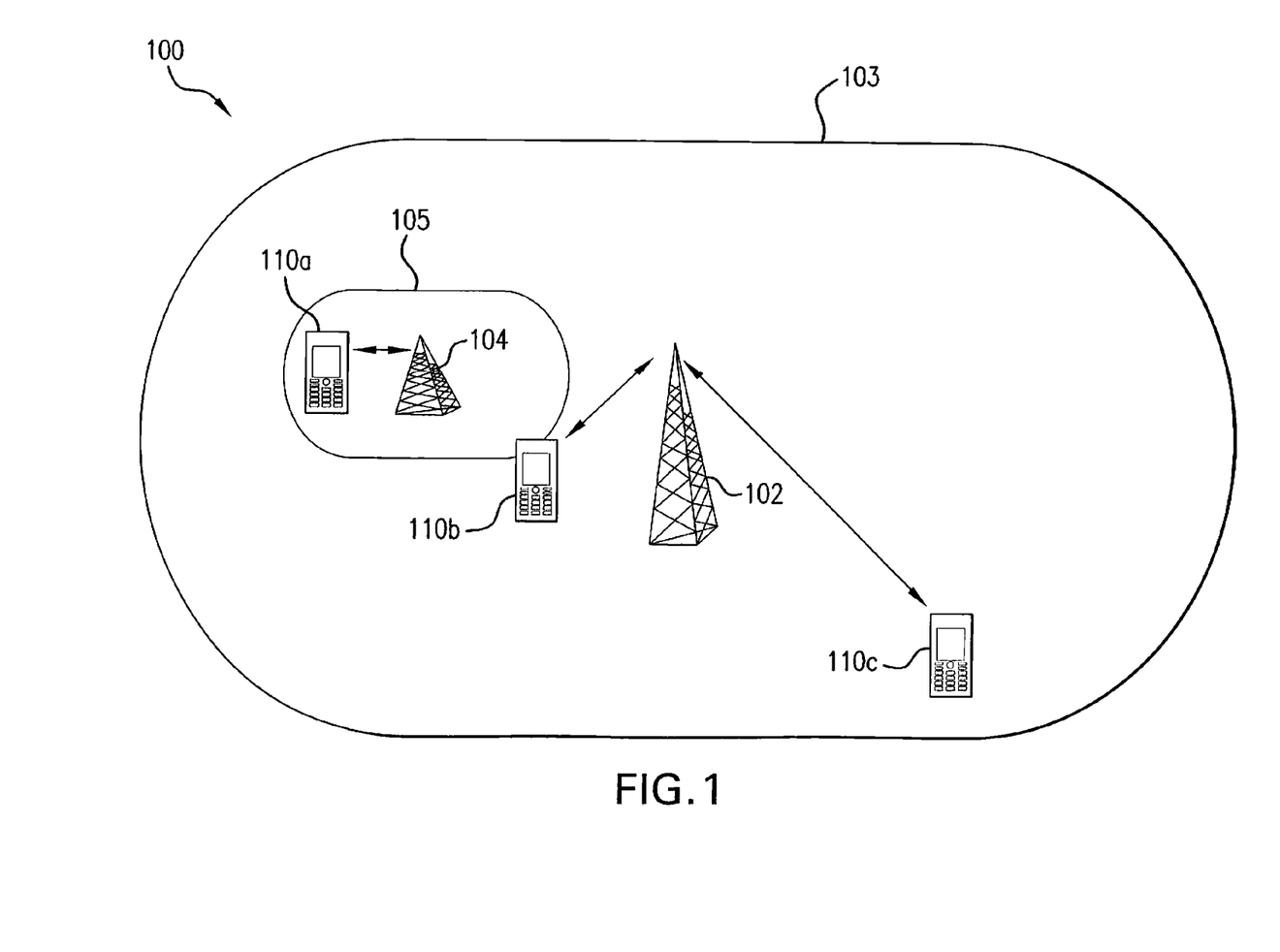
FIG. 1 illustrates a system according to an embodiment of the invention.

Referring to FIG. 1, FIG. 1 illustrates a system 100 according to some embodiments of the invention. As illustrated in FIG. 1, system 100 includes a macro base station 102 having a coverage area 103 and a femto base station 104 having a coverage area 105. As further illustrated, at least a portion of coverage area 105 (or "cell 105") is within cell 103.

Figure 2:
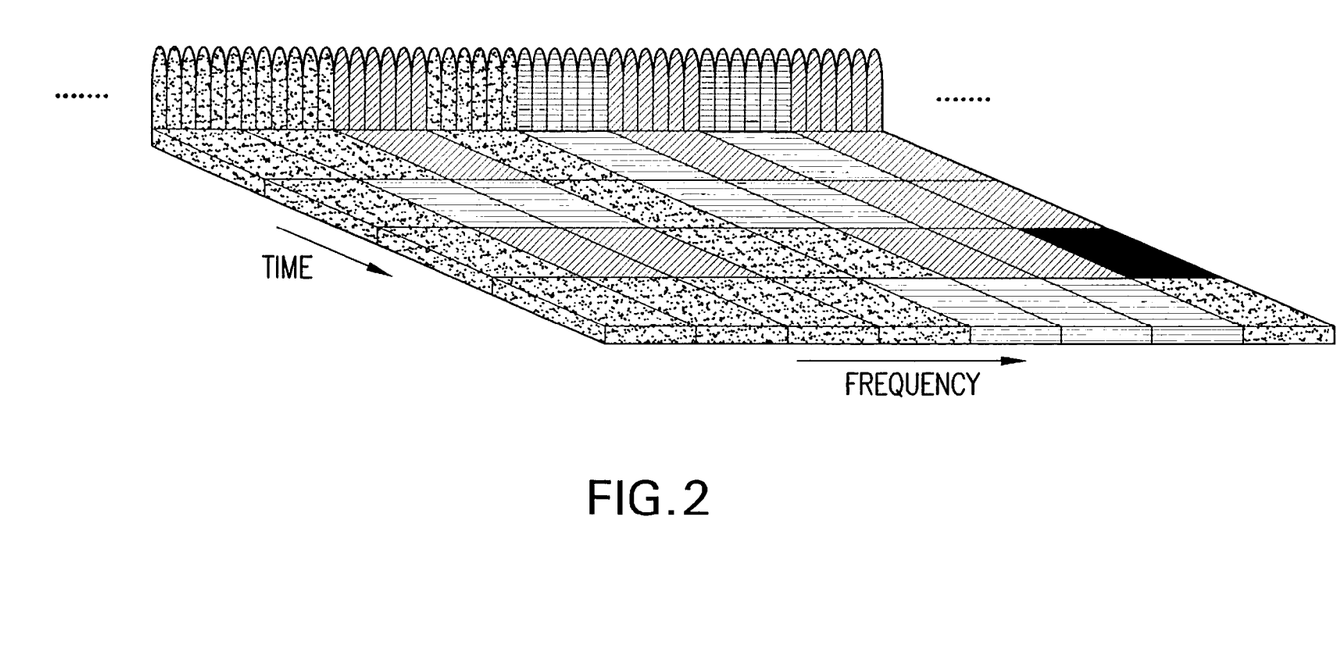
FIG. 2 illustrates different resource blocks.

Macro base station 102 may be configured to communicate with user equipment (UE) 110 (e.g., UE 110b and/or 110c) using a frequency spectrum having a certain bandwidth. For example, base station 102 may be configured to communicate with UEs 110 using a frequency spectrum having a bandwidth of 20 MHz (e.g., a frequency spectrum of 700 MHz to 720 MHz). Macro base station 102 may be configured to allocate resource blocks (RBs) to a UE (e.g., UE 110c) for downlink and uplink communications, as illustrated in FIG. 2. In the exemplary FIG. 2, the differently shaded blocks represent different UEs and their allocated RBs in the frequency and time domains. Accordingly, an RB may have a frequency component and a time component. RBs may be allocated to a UE based on signal quality. For example, a UE 110 may report to macro base station 102 a channel quality indicator (CQI) value that represents the quality of a downlink signal. Similarly, base station 102 may estimate a CQI value that represents the quality of an uplink signal received from UE 110. Base station 102 can use this information to avoid scheduling the UE 110 on RBs that experience bad quality.

The maximum number of RBs in the frequency domain is dependent on the bandwidth of the available frequency spectrum. For example, with a bandwidth of 20 MHz, the maximum number of RBs in the frequency domain is 100, and with a bandwidth of 10 MHz the maximum number of RBs in the frequency domain is 50.

Like macro base station 102, femto base station 104 may be configured to communicate with user equipment (UE) 110 (e.g., UE 110a) using a frequency spectrum having a certain bandwidth. For example, femto base station 104 may be configured to communicate with UEs 110 using a frequency spectrum having a bandwidth of 5 MHz (e.g., a frequency spectrum of 715 MHz to 720 MHz). Also, like macro base station 102, femto base station 104 allocates resource blocks to UEs.

In those cases where the frequency spectrum used by the femto base station at least partially overlaps with the frequency spectrum used by macro base station 102, there is a relatively large probability of macro-femto interference. The present invention aims to reduce this interference. In one aspect, the interference is reduced by dynamically using the spectrum available.

Figure 3:
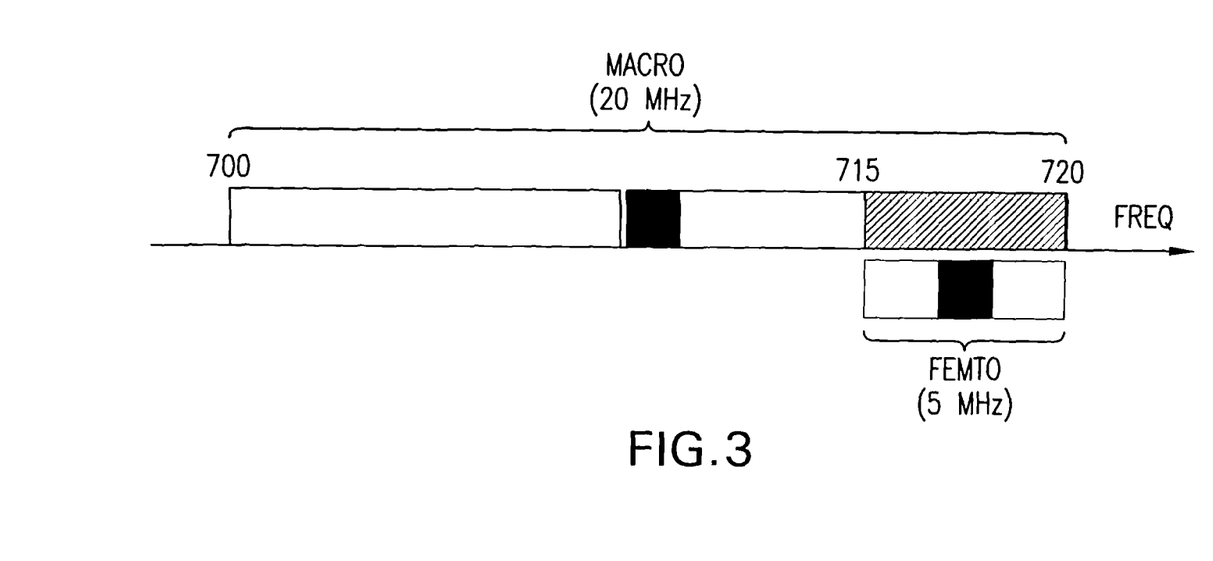
FIG. 3 illustrates an example frequency spectrum allocation according to an embodiment.

For the sake of illustration, we shall describe an embodiment of the invention in the case where macro base station 102 is allocated a downlink frequency spectrum of 700 MHz-720 MHz, and femto base station is allocated a downlink frequency spectrum of 715 MHz-720 MHz (see FIG. 3). Accordingly, in this example, the bandwidth of the spectrum allocated to femto base station 104 is less than the bandwidth of the spectrum allocated to macro base station 102, and the spectrum allocated to femto base station 104 completely falls within the spectrum allocated to base station 102.

In this scenario, macro base station 102 is configured to avoid using the overlapping part of the spectrum (i.e., 715 MHz to 720 MHz). By doing so, the macro base station 102 effectively limits the downlink interference towards underlying femto base stations 104.

Macro base station 102 may be configured to avoid using the overlapping part of the spectrum (i.e., the portion of its spectrum that is shared with femto) by configuring macro base station 102 to use such shared portion if, and only if, certain criteria are satisfied. For example, macro base station 102 may be configured to use the shared portion of its spectrum if, and only if, the amount of the non-shared frequency spectrum (e.g., the number of RBs available from the non-shared portion of its spectrum—700 MHz to 715 MHz, in the example shown) is less than or equal to a threshold. For instance, if there are no RBs available from the non-shared portion of the spectrum, then macro base station 102 may use an RB that falls within the shared portion of the spectrum. In such an embodiment, macro base station 102 must know what portion of its spectrum is shared with femto. Accordingly, information identifying the spectrum allocated to femto base station 104 may be stored in a storage unit accessible to macro base station 102.

Figure 4:
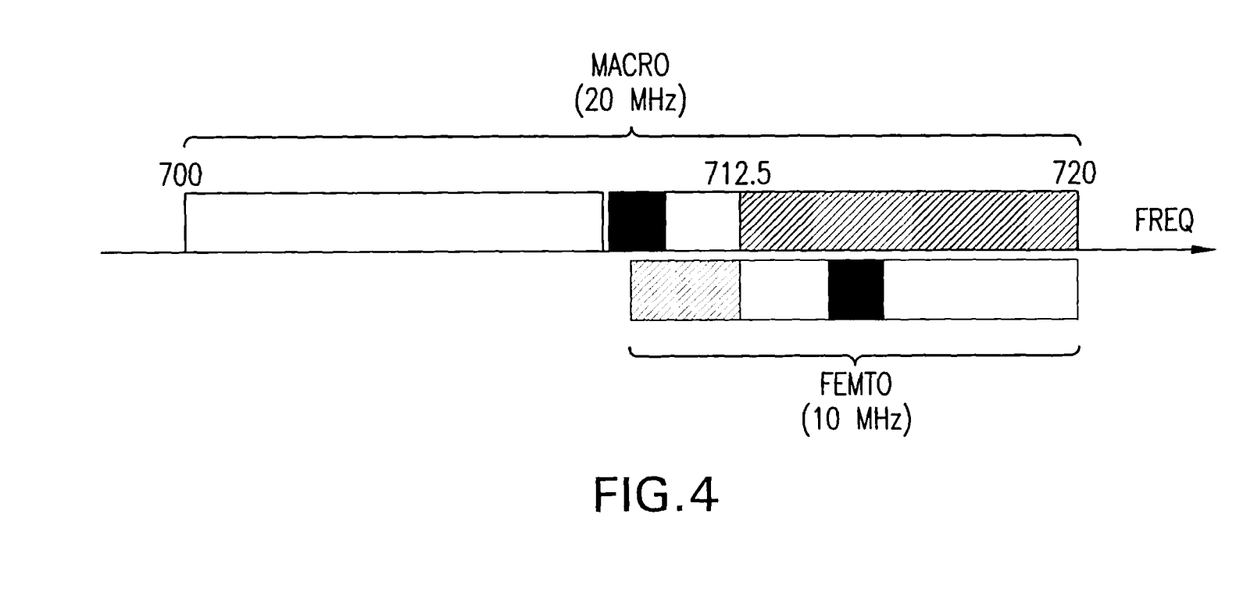
FIG. 4 illustrates an example frequency spectrum allocation according to another embodiment.

Referring now to FIG. 4, FIG. 4 illustrates an alternative frequency spectrum allocation between macro base station 102 and femto base station 104. As in the previous embodiment, macro base station 102 may be allocated a 20 MHz bandwidth frequency spectrum (e.g., 700 MHz to 720 MHz). But in this embodiment, femto base station 104 may be allocated a bandwidth of 10 MHz (e.g., 710 MHz to 720 MHz). Additionally, in this embodiment, femto base station 104 can be dynamically configured to use less than all of the bandwidth allocated to it. That is, femto base station 104 may be configured to not use a portion of its allocated spectrum. The portion of the total allocated spectrum that femto base station 104 is configured to use is referred to as the "active" spectrum. As a specific example, at time t=0, femto base station 104 may have been allocated a frequency spectrum of 710-720 MHz, but also may have been configured to use only the frequency range 712.5-720, which is referred to as the active spectrum.

In this embodiment, to reduce interference, macro base station 102 is configured to avoid using the portion of the femto base station 104's active spectrum that overlaps with macro base station's spectrum. In the specific example shown in FIG. 4, macro base station 102 is configured to avoid using RBs that fall within the 712.5-720 MHz spectrum.

As before, macro base station 102 may be configured to avoid using the portion of the femto base station 104's active spectrum that overlaps with the macro base station's spectrum (i.e., the portion of its spectrum that is actively shared with femto) by configuring macro base station 102 to use such actively shared portion if, and only if, certain criteria (e.g., performance criteria) are satisfied. For example, macro base station 102 may be configured to use the actively shared portion of its spectrum if, and only if, there are no RBs available from the non-shared portion of its spectrum (i.e., 700 MHz to 712.5 MHz, in the example shown). In such an embodiment, macro base station 102 must know what portion of its spectrum is actively shared with femto. Accordingly, information identifying the femto's active spectrum may be stored in a storage unit accessible to macro.

An advantage of this embodiment is that the femto's active spectrum may change over time to accommodate changes in load. For example, the femto's active spectrum may change based on capacity needs of femto base station 104 and/or macro base station 102. For instance, if the capacity need of macro base station 102 increases greatly, macro base station 102 (or another node) may instruct femto base station 104 to reduce its active spectrum. In order for macro base station 102 to avoid using femto's active spectrum, macro base station 102 should be informed of changes to the femto's active spectrum (e.g., via an interface between base stations, in LTE this could be via the X2 interface) so it can store and use this information to avoid using RBs that fall within the femto's active spectrum.

When macro base station 102 uses the portion of its allocated spectrum that is shared with femto base station 104, macro base station 102 may select the UEs to which RBs from the overlapping part of the spectrum are allocated based on downlink CQI values received from the UEs and uplink CQI values estimated by macro base station 102. For example, when macro base station 102 receives from a UE a bad downlink CQI value for an RB that is within the portion of macro's spectrum that is shared with femto base station 104, macro base station 102 will not allocate to the UE RBs from the overlapping part of the spectrum because, based on the CQI, it is likely the UE is close to a femto base station 104.

Figure 5:
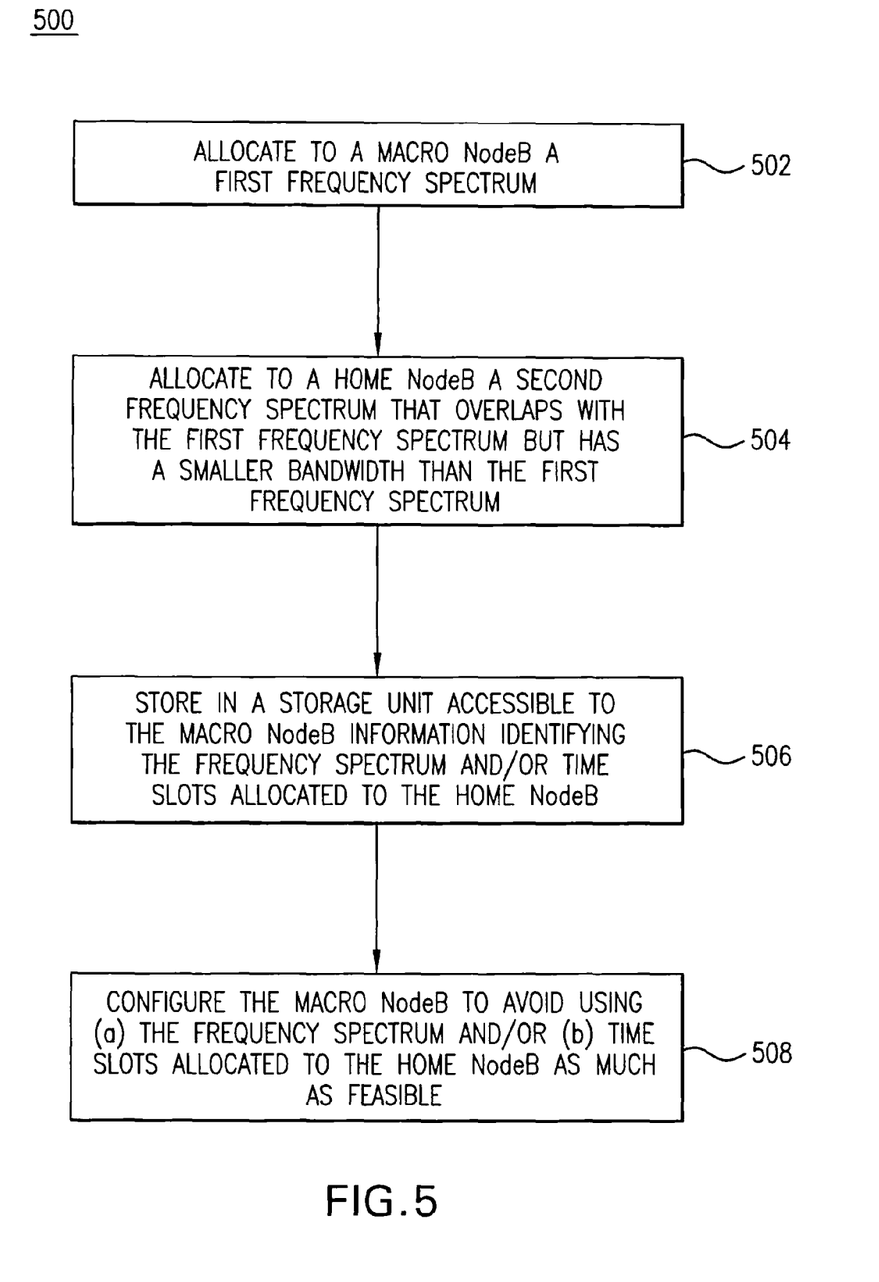
FIG. 5 is a flow chart illustrating a process according to an embodiment of the invention.

Referring now to FIG. 5, FIG. 5 is a flow chart illustrating a process 500 according to an embodiment of the invention. Process 500 may begin in step 502, where a frequency spectrum is allocated to macro base station 102 (e.g., 700 MHz-720 MHz). In step 504, a frequency spectrum is allocated to femto base station 104 (e.g., 715 MHz-720 MHz). Additionally or alternatively, time slots may be allocated to femto base station 104. In step 506, macro base station 102 stores in a storage unit (e.g., a database or file system) information identifying the frequency spectrum and/or time slots allocated to femto base station 104. In step 508, macro base station 102 is configured to avoid using (a) the frequency spectrum and/or (b) time slots allocated to femto base station 104. For example, as discussed above, macro base station 102 may be configured to avoid using the overlapping part of the spectrum (i.e., the portion of its spectrum that is shared with femto) by configuring macro base station 102 to use such shared portion if, and only if, certain criteria (e.g., performance criteria) are satisfied. As a specific example, macro base station 102 may be configured to use the shared portion of its spectrum if, and only if, the number of RBs available from the non-shared portion of its spectrum is less than or equal to a threshold. For instance, if there are no RBs available from the non-shared portion of the spectrum, then macro base station 102 may use an RB that falls within the shared portion of the spectrum.

Figure 6:
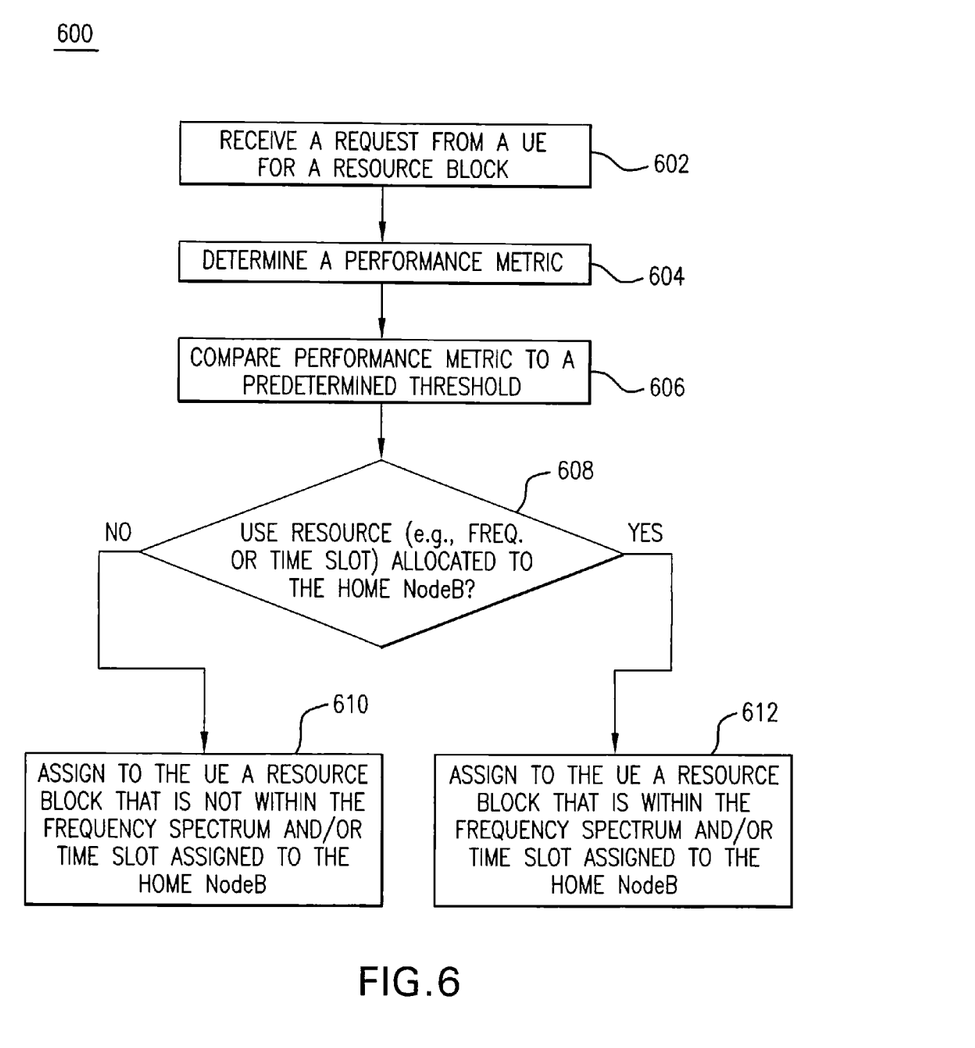
FIG. 6 is a flow chart illustrating a process according to an embodiment of the invention.

Referring now to FIG. 6, FIG. 6 is a flow chart illustrating a process 600 according to an embodiment of the invention. Process 600 may begin in step 602, where macro base station 102 receives a request from a UE for an RB. In response, macro base station 102 (a) determines a performance metric (e.g., determines the number RBs from the portion of its frequency spectrum not shared with femto) (step 604), (b) compares the performance metric to a predetermined threshold (e.g., compares the number of RBs determined in step 604 to the threshold value) (step 606); and then decides whether to use a resource (e.g., frequency or time slot) allocated to femto base station 104 based on a result of the comparison (step 608). Accordingly, based on the result of the comparison, macro base station 102 performs either step 610 or 612. In step 610, macro base station 102 assigns to the UE a resource block that is not within the frequency spectrum and/or time slot assigned to femto, and in step 612, assigns to the UE a resource block that is within the frequency spectrum and/or time slot assigned to femto base station 104.

Although many of the examples used the downlink spectrum allocation to illustrate the invention, the same principles are valid for the uplink direction of communication.

In an alternative embodiment, rather than configuring macro base station 102 to avoid using resources (e.g., time slots and/or frequency spectrum) that are used by femto, macro base station 102 may be configured so that certain RBs (e.g., RBs from the shared portion of the spectrum) are transmitted with a reduced power.

Figure 7:
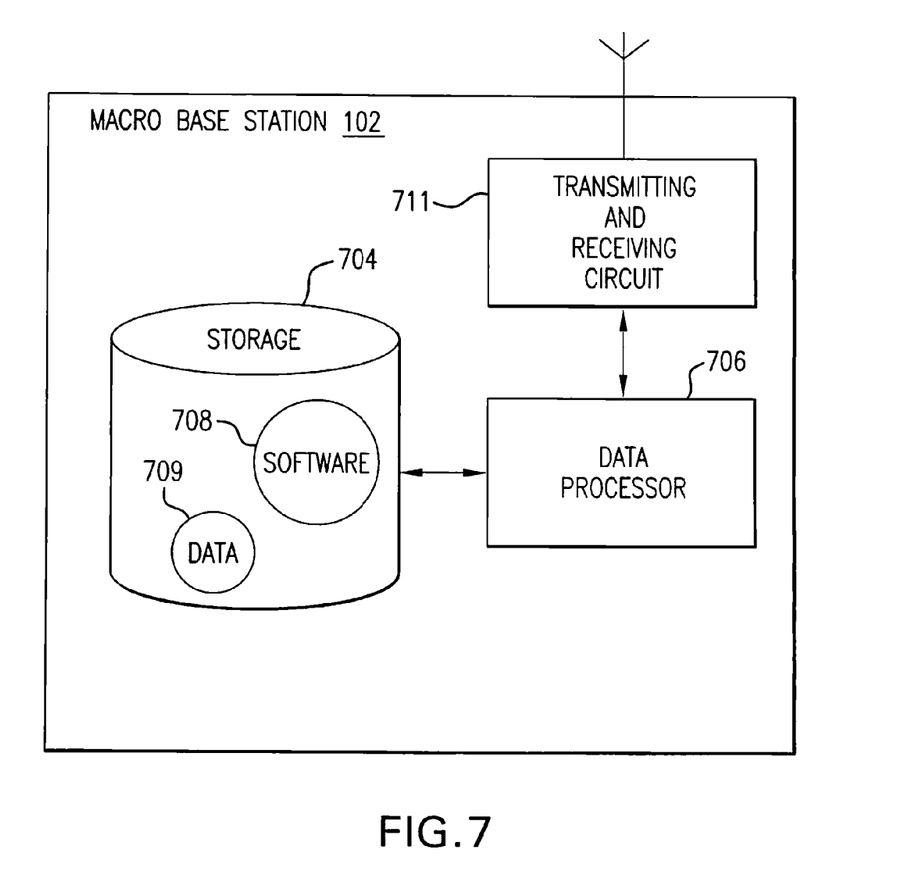
FIG. 7 is a functional block diagram of a macro base station according to some embodiments of the invention.

Referring now to FIG. 7, FIG. 7 is a functional block diagram illustrating a macro base station 102 according to some embodiments. As shown in FIG. 7, macro base station 102 may include a transmitting and receiving circuit 711 for transmitting data to and receiving data from a UE; a storage unit 704 (e.g., a non-volatile data storage) that stores software 708 for implementing the functions and features described above; and a processor 706 (e.g., a microprocessor) for executing software 708. Storage unit 704 may also store information 709 identifying a resource (e.g., a frequency spectrum and/or time slots) allocated to each femto base station 104 that is located within the coverage area of macro base station 102.

While the processes described herein have been illustrated as a series or sequence of steps, the steps need not necessarily be performed in the order described, unless explicitly indicated otherwise.

Further, while various embodiments of the present invention have been described above, it should be understood that they have been presented by way of example only, and not limitation. Thus, the breadth and scope of the present invention should not be limited by any of the above-described exemplary embodiments.

What is claimed is:

1. A method performed by a first base station for reducing interference in a communication system comprising the first base station and a second base station located within or near a cell serviced by the first base station, wherein the first base station is allocated a frequency spectrum and the second base station is allocated a frequency spectrum that at least partially overlaps with the frequency spectrum allocated to the first base station, wherein the first base station is allocated a first time slot and the second base station is allocated a second time slot, the method performed by the first base station comprising:

(a) determining a performance metric;
    (b) comparing the determined performance metric to a predetermined threshold; and
    (c) determining, at the first base station, whether to assign to a user terminal a resource block that is (i) within the frequency spectrum allocated to the second base station that at least partially overlaps with the frequency spectrum allocated to the first base station, or (ii) within the second time slot allocated to the second base station, wherein the determining is based, at least in part, on a result of the comparing of the performance metric with the predetermined threshold.

2. The method of claim 1, wherein a bandwidth of the frequency spectrum allocated to the second base station is smaller than a bandwidth of the frequency spectrum allocated to the first base station, and wherein the frequency spectrum allocated to the second base station completely falls within the frequency spectrum allocated to the first base station.

3. The method of claim 1, wherein:

at least a portion of the frequency spectrum allocated to the first base station does not overlap with the frequency spectrum allocated to the second base station,
    the performance metric corresponds to an amount of said non-overlapping frequency spectrum that is currently available for use, and
    the step of determining whether to assign to the user terminal the resource block that is within the frequency spectrum allocated to the second base station comprises determining whether an amount of non-overlapping frequency spectrum that is currently available for use is greater than or equal to the predetermined threshold.

4. The method of claim 3, further comprising:

assigning to the user terminal the resource block that is within the frequency spectrum allocated to the second base station when said amount of said non-overlapping frequency spectrum that is currently available for use is less than or equal to the threshold.

5. The method of claim 1, further comprising:

receiving a request from the user terminal for a resource block,
    wherein the steps (a) through (c) are performed in response to receiving the request.

6. The method of claim 1, further comprising:

controlling an active frequency spectrum of the second base station based, at least in part, on a resource need of the first base station.

7. The method of claim 1, wherein the performance metric corresponds to a number of available resource blocks that are not within the frequency spectrum allocated to the second base station, and
    wherein the step of determining whether to assign to the user terminal the resource block that is within the frequency spectrum allocated to the second base station comprises determining whether said number of available resource blocks is less than or equal to the predetermined threshold.

8. The method of claim 1, wherein said determining is further based on one more downlink CQI values received from the user terminal and/or one or more uplink CQI values estimated by the first base station.

9. The method of claim 1, wherein the first base station is a macro base station and the second base station is a femto base station.

10. A communication system, comprising:

a first base station servicing a first coverage area, the first base station being allocated first time slots and a frequency spectrum for servicing the first coverage area; and
    a second base station servicing a second coverage area, the second base station being allocated second time slots and a frequency spectrum for servicing the second coverage area,
    wherein the second coverage area overlaps with the first coverage area,
    wherein the frequency spectrum allocated to the second base station at least partially overlaps with the frequency spectrum allocated to the first base station, and
    wherein the first base station is configured to avoid using (i) a portion of its allocated frequency spectrum that overlaps with the frequency spectrum allocated to the second base station and/or (ii) the second time slots allocated to the second base station.

11. The communication system of claim 10, wherein a bandwidth of an active frequency spectrum of the second base station is controlled based, at least in part, on a capacity need of the second base station and/or a capacity need of the first base station.

12. The communication system of claim 11, wherein the bandwidth of the active frequency spectrum of the second base station is increased upon a determination that the capacity need of the second base station meets or exceeds a first threshold and/or the capacity need of the first base station is less than or equal to a second threshold.

13. The communication system of claim 11, wherein the first base station is configured to avoid utilizing frequencies that fall within an active frequency spectrum of the second base station.

14. The communication system of claim 10, wherein the first base station comprises a storage unit that stores information identifying an active frequency spectrum of the second base station.

15. The communication system of claim 10, wherein the first base station is further configured to:
    (a) determine a performance metric;
    (b) compare the determined performance metric to a predetermined threshold; and
    (c) determine whether to assign to a user terminal a resource block that falls within the frequency spectrum allocated to the second base station, wherein the determination is based, at least in part, on a result of the comparison of the performance metric with the predetermined threshold.

16. The communication system of claim 15, wherein the determination is further based on one more downlink CQI values received from the user terminal and/or one or more uplink CQI values estimated by the first base station.

17. The communication system of claim 15, wherein:
    at least a portion of the frequency spectrum allocated to the first base station does not overlap with the frequency spectrum allocated to the second base station, and
    the performance metric corresponds to an amount of non-overlapping frequency spectrum that is currently available for use.

18. The communication system of claim 15, wherein the first base station is further configured to receive a request from the user terminal for the resource block and perform steps (a) through (c) in response to receiving the request.

19. The communication system of claim 10, wherein the first base station comprises a storage unit for storing information identifying the frequency spectrum allocated to the second base station.

20. A base station for servicing a first coverage area, the base station being a first base station allocated first time slots and a frequency spectrum for servicing the first coverage area, the base station comprising:

a circuit configured to reduce interference, wherein the circuit configured to reduce the interference comprises a resource avoiding circuit configured to avoid using certain resources unless performance reasons require the use of one or more of the certain resources,
wherein the certain resources include: (i) frequencies within a frequency spectrum allocated to a second base station that at least partially overlaps with the frequency spectrum allocated to the first base station, servicing a second coverage area that overlaps with the first coverage area and/or (ii) second time slots allocated to the second base station.

21. The base station of claim 20, wherein the certain resources include resource blocks within the frequency spectrum allocated to the second base station.

22. The base station of claim 20, wherein the certain resources include time slots allocated to the second base station.

23. The base station of claim 20, wherein the resource avoiding circuit is configured to:
    (a) determine a performance metric;
    (b) compare the determined performance metric to a predetermined threshold; and
    (c) determine whether to assign to a user terminal a resource block that is (i) within the frequency spectrum allocated to the second base station or (ii) within a time slot allocated to the second base station, wherein the determination is based, at least in part, on a result of the comparison of the performance metric with the predetermined threshold.

24. The base station of claim 23, wherein the performance metric corresponds to a number of resource blocks within the portion of the frequency spectrum allocated to the base station that does not overlap with the frequency spectrum allocated to the second base station that are available.

25. The base station of claim 23, further comprising:
    a receiver configured to receive a request from the user terminal for the resource block,
    wherein the steps (a) through (c) are performed in response to receiving the request.

26. The base station of claim 20, wherein the determination is further based on one more downlink CQI values received from the user terminal and/or one or more uplink CQI values estimated by the base station.

27. The base station of claim 20, wherein the base station is a macro base station and the second base station is a femto base station.

* * * * *

UNITED STATES PATENT AND TRADEMARK OFFICE
CERTIFICATE OF CORRECTION

PATENT NO. : 8,583,135 B2
APPLICATION NO. : 13/055585
DATED : November 12, 2013
INVENTOR(S) : Hiltunen et al.

It is certified that error appears in the above-identified patent and that said Letters Patent is hereby corrected as shown below:

On the Title Page, Item (54), and in the Specification, Column 1, Line 2, in Title, delete "BETWEEN AND A" and insert -- BETWEEN A --, therefor.

On the Title Page, Item (75), under "Inventors", in Column 1, Line 2, delete "Varmdo" and insert -- Värmdö --, therefor.

On the Title Page, Item (75), under "Inventors", in Column 1, Line 3, delete "Jarna" and insert -- Järna --, therefor.

On the Title Page, Item (57), under "ABSTRACT", in Column 2, Line 1, delete "bas" and insert -- base --, therefor.

On the Title Page, Item (57), under "ABSTRACT", in Column 2, Line 3, delete "configuring t macro" and insert -- configuring macro --, therefor.

On the Title Page, Item (57), under "ABSTRACT", in Column 2, Line 4, delete "allocat" and insert -- allocated --, therefor.

Signed and Sealed this
Eighth Day of July, 2014

Michelle K. Lee
*Deputy Director of the United States Patent and Trademark Office*